(12) United States Patent
Kessler et al.

(10) Patent No.: US 6,311,363 B1
(45) Date of Patent: Nov. 6, 2001

(54) WIPER BLADE FOR CLEANING MOTOR VEHICLES WINDSCREENS

(75) Inventors: Peter Kessler, Sasbach; Juergen Mayer, Gaggenau, both of (DE); Jan Vanroy, Schaffen; Koen Lammens, Leuven, both of (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,112
(22) PCT Filed: Jul. 9, 1998
(86) PCT No.: PCT/DE98/01894
§ 371 Date: Apr. 7, 1999
§ 102(e) Date: Apr. 7, 1999
(87) PCT Pub. No.: WO99/08912
PCT Pub. Date: Feb. 25, 1999

(30) Foreign Application Priority Data

Aug. 14, 1997 (DE) .............................. 197 35 300

(51) Int. Cl.$^7$ ...................................... B60S 1/38
(52) U.S. Cl. ................. 15/250.454; 15/250.453; 29/897.2

(58) Field of Search ................ 15/250.451, 250.452, 15/250.453, 250.454, 250.43, 250.44, 250.48, 250.361; 29/897.2

(56) References Cited

U.S. PATENT DOCUMENTS

| 4,566,147 | * | 1/1986 | Baerenwald et al. | ............ 15/250.454 |
| 4,993,103 | * | 2/1991 | Takahashi et al. | .............. 15/250.454 |
| 6,112,365 | * | 9/2000 | Ulrich et al. | ..................... 15/250.454 |

FOREIGN PATENT DOCUMENTS

19522273 * 1/1997 (DE) .
2036547 * 7/1980 (GB) .

* cited by examiner

Primary Examiner—Gary K. Graham
(74) Attorney, Agent, or Firm—Michael J. Striker

(57) ABSTRACT

A wiper blade for cleaning windows of motor vehicles has a support bracket system having retaining claws disposed on claw brackets. The retaining claws grip a head strip of a wiper strip of an elastic material which is fixed longitudinally with a securing body shaped from sheet metal. The securing body is solidly joined to the wiper strip and engages the retaining claw from behind at least with a hook in the form of a snap connection disposed on one wiper arm. The hook is shaped by bending or swaging of the arm and is adjoined in the assembly direction by a guide face.

12 Claims, 3 Drawing Sheets

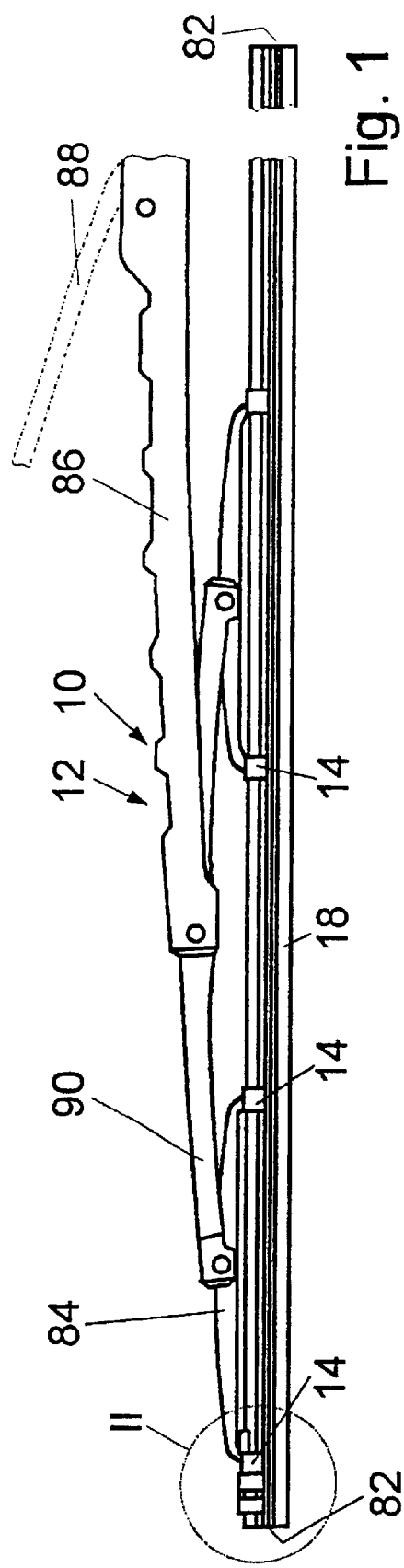

WIPER BLADE FOR CLEANING MOTOR VEHICLES WINDSCREENS

BACKGROUND OF THE INVENTION

The invention is based on a wiper blade.

In windshield wiper systems for motor vehicles, a fastening part is generally secured to a drive shaft, and a pivoting part is connected to it via a shaft. The pivoting part is adjoined by a wiper rod, from which a wiper blade is suspended. The wiper blade has a support bracket system with a plurality of members and with intermediate brackets pivotably connected to a main bracket; claw brackets are pivotably connected to the ends of the intermediate brackets and have retaining claws on their ends. A wiper strip is retained by the retaining claws. The support bracket system makes it possible for the wiper strip to adapt to a curved window during wiping. A spring rail is placed in the rubber profile of the wiper strip in order to achieve a uniform contact pressure with the window.

When the windshield wiper system is actuated, the wiper strip slides over the motor vehicle window and in the process is subjected to unavoidable wear, which impairs the cleaning quality. The wiper strip must therefore be replaced from time to time. Since as a rule the support bracket system of the wiper blade is still fully functional by then, the end user is sold a so-called refill kit, so the old support bracket system can continue to be used.

From German Patent Disclosure DE 195 22 273 A1, a wiper blade is known into which a refill kit comprising a wiper strip with a spring rail and a securing body can be introduced. The spring rail is disposed in a head strip of the wiper strip, in a longitudinal channel that is closed all the way around and opens out at the end faces of the wiper strip. The securing body is slipped onto one end of the head strip and in the process, with legs encompassing the head strip, engages longitudinal grooves on two opposed longitudinal sides of the head strip. It is thus fixed on the head strip except for the longitudinal direction.

The securing body has a fastening clamp, which presses channel walls of the head strip into recesses of the spring rail and thereby fixes the securing body, spring rail and wiper strip longitudinally relative to one another. Once the used wiper strip is removed from the wiper blade, the preassembled refill kit can be thrust into the retaining claws of the support bracket system of the wiper blade; the retaining claws engage the longitudinal grooves in the wiper strip. The securing body has not only the fastening clamp but a spring clamp with deflectable spring arms and hooks disposed on them. Once the refill has been thrust virtually all the way into the retaining claws, the hooks of the spring clamps are swiveled out of a retaining claw disposed on the outer end of the support bracket system, and on the other side they snap in the form of a snap closure onto the retaining claw, so that the securing body contacts the retaining claw on both sides and fixes the wiper strip longitudinally to the support bracket system.

The spring clamp is cut out of a larger sheet-metal part after a stamping or other cutting operation, either after or before a bending operation. The hooks are formed by a right-angle shoulder made in the cut outer contour of the sheet-metal part; after the bending operation, in the installed state, this shoulder extends in the direction pointing away from the window.

The thinner the metal sheet, the sharper are the edges that are created at the cut outer contour; they can be removed only with great effort and often not completely. When the refill kit is removed, with the spring clamp described, pressure must be exerted on the cut outer contour in the region of the hooks in order to unsnap it. The sharp outer contours can cause injury then. The risk of injury is present not only during disassembly but also during installation, cleaning, and so forth.

SUMMARY OF THE INVENTION

In the embodiment according to the invention the hooks are formed by bending or swaging of an arm of the securing body; this produces wide faces crosswise to the deflection direction, regardless of the material thickness; these wide faces prevent injuries during installation and disassembly. Especially when the securing body is disassembled, there is no need to press on a cut outer contour in order to unsnap the securing body or hook. Furthermore, the side of the sheet metal on which a burr may form on one edge in the cutting to a pattern, can be placed in such a way that this edge points in the actuation direction. By means of the guide face adjoining the hook in the assembly direction, a dangerous cut outer contour edge in the region of the hook is avoided. The arm should also defect automatically when the securing body is mounted so that it can snap back into a detent position after the retaining claw. This is achieved with a guide face which either extends obliquely to the assembly direction or in the assembly correspondingly meets a wall of the retaining claw and deflects the arm.

The arm of the securing body may be moved past the outside of the retaining claw of a claw bracket or preferably be guided through the space between the retaining claw and the wiper strip and secures the wiper strip with the hook in the form of a snap connection by snapping onto the retaining claw after the retaining claw. In disassembly, the hook must be forced out of the detent position in order to loosen the securing body or remove the wiper strip. For that purpose, the hook should be disposed in an easily accessible way. This is attained according to the invention with at least one arm extending laterally of the head strip longitudinally of the wiper strip and having a hook that extends laterally outward. The hook is thus freely accessible from the side, without hindrance from components to access and thus disassembly, and can thus be easily pressed out of the detent position in the direction of the wiper strip. It is also possible for the arm and the hook to be disposed on the side of the wiper strip away from the window, that is, on an upper face of the head strip. In such a design, however, the access to the hook might be hindered by the claw bracket.

According to the invention, two arms extending substantially parallel from one another are disposed on a platformlike base part of a spring clamp of the securing body. The platformlike base part rests on the upper face, pointing away from the window, of the head strip, and the arms extend laterally, longitudinally of the wiper strip. It is also possible for the wiper strip to be secured with only one arm, but a better hold is attained with two arms and hooks. If there is a flat stop face, the two hooks are located in a transverse plane, and as a result they can easily be pressed out of the detent position from two sides in a plane in the direction of the wiper strip, for instance with one hand, using the thumb and index finger.

A plurality of spring rails may be disposed in the wiper strip. However, preferably only one spring rail is disposed in a longitudinal channel that is closed all the way around and opens out at two end faces of the wiper strip. If the arms of the spring clamps are introduced through the space between the retaining claw and the wiper strip, then they must be pressed in the direction of the wiper strip in order to install the wiper strip and in order, in disassembly, to press the hooks out of the detent position. It is proposed that the spring rail has a recess in the region of the hook, preferably extending from one hook shoulder to the end of the arm in the assembly direction, and as a result the arm together with the hook can be pressed into the recess in the direction of the wiper strip in both installation and disassembly.

An especially economically produced spring clamp is obtained if the spring clamp is embodied integrally with the arms that have the hooks. Spring band steel is preferably used as the material; it has the appropriate elasticity to create the snap closure.

To enable the securing body to secure the wiper strip longitudinally on the retaining claw, the securing body must be firmly joined to the wiper strip once the hook has snapped into place. In principle, this can be attained by means of form locking, force locking, and possibly in exceptional cases material locking as well. It is proposed that the securing body have a fastening clamp, which with legs extending crosswise to the length at least partly grips the head strip of the wiper strip and presses lateral channel walls of the wiper strip into recesses of the spring rail disposed in the longitudinal channel that is closed all the way around. Thus with the fastening clamp, the spring rail is secured in and the securing body is secured on the wiper strip by both form locking and force locking. The fastening clamp can be embodied as a separate component, which after assembly is joined by force locking and/or form locking to the spring clamp. However, it is proposed that the fastening clamp be formed integrally onto the spring clamp, which achieves a compact and economical arrangement that is easy to install.

According to the invention, a narrow rib is disposed in the recess of the spring rail, and around it the legs of the installed fastening clamp press the elastic material of the wiper strip, thus achieving a favorable form lock between the spring rail and wiper strip.

In a further feature of the invention, one tab, extending in the assembly direction, is disposed on each of the legs of the fastening clamp, the legs laterally including the head strip of the wiper strip; once the refill kit is installed this tab is grasped by the retaining claw. The tabs are held in their prescribed assembly position by the retaining claw, and thus the legs are secured against springing open without particular production or assembly effort or expense.

To compensate for the play between the securing body and the retaining claw and thus between the refill kit and the support bracket system, the tabs are curved out of the plane of the legs, and the free end of the tabs forms an inward-pointing stop face. The stop faces come into contact with the retaining claw before the tabs and in assembly press the tabs inward, thus making assembly easier and compensating for the play.

The refill kit is secured by the hooks in only one longitudinal direction. According to the invention, the securing body secures the refill kit in the opposite direction with at least one outward bulge on the platformlike base part in the region of the legs of the fastening clamp, whose end edge faces toward the hook. The spacing between the hook shoulder and the end edge is adapted to the length of the retaining claw of the claw bracket, so that via the securing body, the refill kit is braced on the retaining claw in both longitudinal directions with as little play as possible.

In an economical way, the securing body is made from a one-piece sheet metal part in a stamping and bending process. Instead of bending, the hook can also be made by swaging, in which a hooklike protrusion is forced out of the sheet-metal arm by a tool.

BRIEF DESCRIPTION OF THE DRAWINGS

In the drawing, one exemplary embodiment of the invention is shown. Numerous characteristics are shown and described in conjunction with one another in the description and the claims. One skilled in the art will expediently also consider the characteristics individually and combine them to make additional appropriate combinations.

FIG. 1, a fragmentary view of a wiper blade embodied according to the invention;

FIG. 2, an enlarged illustration of a detail II in FIG. 1;

DESCRIPTION OF THE PREFERRED EMBODIMENTS

Figure 3:
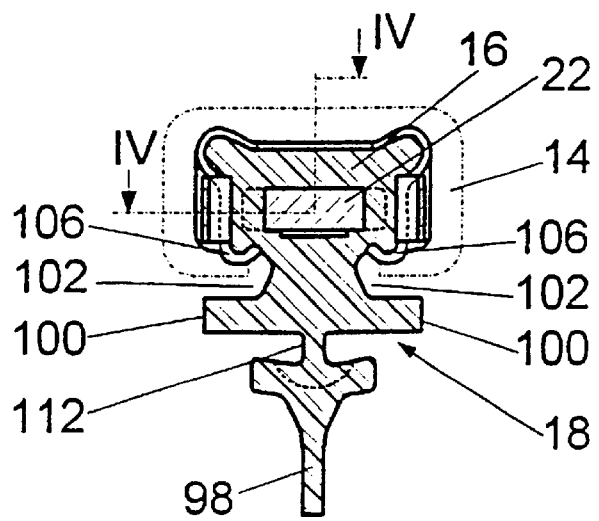
FIG. 3, a section taken along the line III—III of FIG. 2.

A wiper blade 10 shown in FIG. 1 is part of a windshield wiper, not shown completely, of a motor vehicle. The wiper blade 10 is moved over a window to be wiped of the motor vehicle by means of a driven wiper arm 88 shown in dot-dashed lines in FIG. 1. The wiper blade 10 in the exemplary embodiment includes a multi-member support bracket system 12 with intermediate brackets 90, which are pivotably connected to a main bracket 86 and with whose ends claw brackets 84 are pivotably connected, the claw brackets in turn having retaining claws 14 on their ends. The retaining claws 14 include a wiper strip 18 that is made of an elastic material. Both the wiper strip 18 and the support bracket system 12 are embodied in elongated fashion (FIG. 1).

As FIG. 3 shows, the wiper strip 18 has a head strip 16, which is joined via a tilting rib 112 to a wiper lip 98 that rests on the window to be wiped. Longitudinal grooves 102 are disposed facing one another on the two long side faces 100 of the head strip 16, and they are engaged in a known manner by the retaining claws 14 of the claw brackets 84. Since the longitudinal grooves 102 open out at two end faces 82 of the wiper strip 18, they can easily be thrust in their longitudinal direction into the retaining claws 14 of the claw brackets 84. To achieve a proper distribution of the contact pressure of the wiper blade 10 or wiper strip 18 on the window to be wiped, an elongated spring rail 22 is disposed in the head strip 16, in a longitudinal channel 20 (FIGS. 3 and 4) that is closed all the way around and that opens out at the two end faces 82 of the wiper strip 18.

Figure 4:
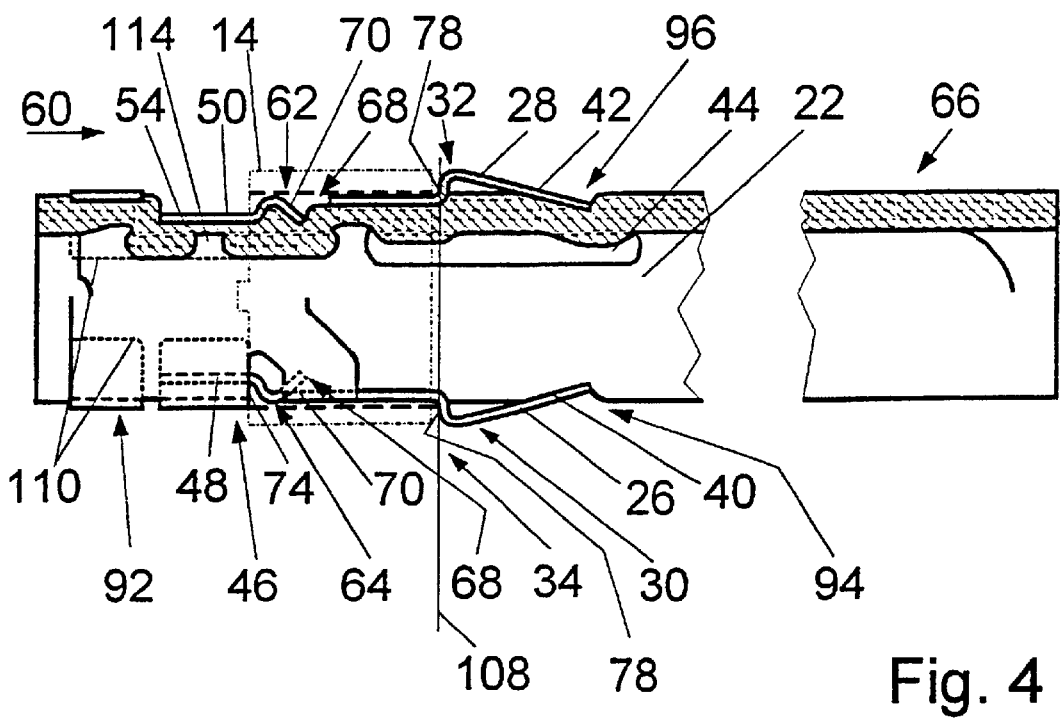
FIG. 4, a half section taken along the line IV—IV of FIG. 3.
Figure 5:
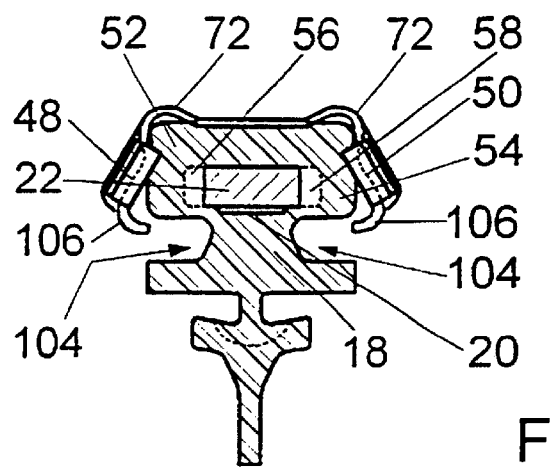
FIG. 5, a section taken along the line III—III in FIG. 2 in the still unswaged state.
Figure 6:
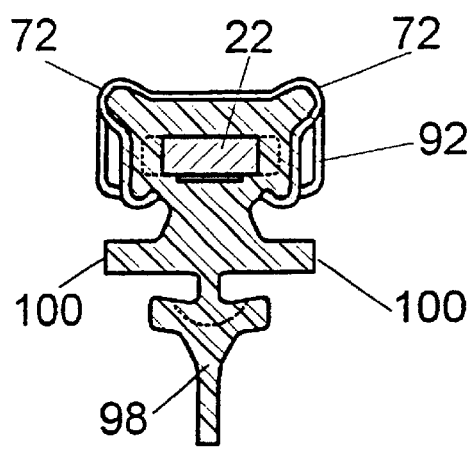
FIG. 6, a section taken along the line VI—VI in FIG. 2.

The wiper strip 18 is fixed longitudinally in the retaining claws 14 by a securing body 24, which is disposed on an end region of the wiper strip 18. The spring rail 22 is provided on its end region with two opposed lateral recesses 56, 58, open at their edges, into which the channel walls 52, 54 of a wiper strip are pressed by a fastening clamp 46 of the securing body 24 (FIGS. 4 and 5). In the exemplary embodiment, the fastening clamp 46 is integrally joined to the securing body 24, but may also be embodied as a separate component.

Once the spring rail 22, in the installation of the refill kit 66, has been introduced into the longitudinal channel 20 of the wiper strip 18, the securing body 24 is thrust jointly with the fastening clamp 46 on the head strip 16 of the wiper strip 18, until its legs 48, 50, shown in FIG. 5, are located above the recesses 56, 58. A guide clamp 92 is disposed on the securing body 24; with two legs 110 extending crosswise to the length, it grips the head strip 16 of the wiper strip 18 in its longitudinal grooves 102, in order to achieve a favorable guidance (FIG. 2).

Once the legs 48, 50 have been thrust across the recesses 56, 58, they are pressed inward in the direction of the arrows 104 in FIG. 5, so that with hooks 106 disposed on their ends they engage the longitudinal grooves 102 of the head strip 16 (FIG. 3). The fastening clamp 46 is adapted in such a way to the wiper strip 18 or the recesses 56, 58 that once the channel walls 52, 54 have been pressed by the legs 48, 50 into the recesses 56, 58 of the spring rail 22, the spring rail 22 is form-lockingly joined to the wiper strip 18, which in turn is joined form-lockingly to the fastening clamp 46. A rib 114 is disposed in the recesses 56, 58, and the material of the wiper strip 18 conforms to this rib when the channel walls 52, 54 of the wiper strip 18 are pressed into the recesses 56, 58. This improves the form lock between the spring rail 22 and the wiper strip 18.

One tab 62, 64 extending in the assembly direction 60 is disposed on each of legs 48, 50 of the fastening clamp 46; when the refill kit 66 has been installed, the retaining claw 14 of the claw bracket 84 fits over this tab (FIGS. 2 and 4). When the legs 48, 50 are tensed, the tabs 62, 64 are also pressed into the head strip 16. To allow the wiper strip to be introduced easily into the retaining claws 14, there is play between the retaining claws 14 and the wiper strip 18. To eliminate this play in the installed state in the region of the securing body 24, the tabs 62, 64 are bent outward out of the plane of the legs 48, 50. In the assembly direction 60, the tabs 62, 64 have stop faces 70, which extend oblique toward the wiper strip 18. The stop faces 70 come into contact with the retaining claw 14 before the tabs 62, 64 and thus press the tabs 62, 64 inward, thus making assembly easier and compensating for the play (FIG. 4).

In order to secure the wiper strip 18 with the securing body 24 against longitudinal displacement relative to the support bracket system 12, the securing body 24 has a spring clamp 34 (FIG. 2), preferably made of spring steel. The spring clamp 34 can be made as a separate component. However, it is proposed that it be joined integrally to the fastening clamp 46. It has a platformlike base part 36, which rests on an upper surface 38, pointing away from the window, of the head strip 16. From the base part 36, two arms 26, 28 extend parallel and spaced apart from one another. They are trimmed by approximately 90° relative to the base part 36, thus producing lateral cheeks that in the direction of their free end 94, 96 have a hook 30, 32, which is adjoined in the assembly direction 60 by a guide face 40, 42 extending obliquely to the wiper strip 18. The hooks 30, 32 are made by bending or swaging of the arms 26, 28 and extend laterally outward and are preferably disposed in a transverse plane 108 (FIG. 4). The securing body 24 could, however, also be made with only one arm, which extends along the upper surface 38 of the head strip 16 and has a hook with a hook shoulder that is substantially perpendicular to the upper surface 38.

In the installed state of the securing body 24 on the wiper strip 18, a lateral recess 44 open at the edge is present in the spring rail 22 in the region of the hook 30, 32 (FIG. 4). As a result, in installation and disassembly, the hooks 30, 32 can easily be pressed out of their detent position against the wiper strip 18.

By means of the hooks 30, 32, the securing body 24 and the wiper strip 18 are fixed in only one longitudinal direction. To fix the wiper strip 18 in the second longitudinal direction as well, the base part 36, in the region of the legs 48, 50 of the fastening clamp 46, has outward bulges 72, whose end edges 74 point in the direction of the hook shoulders 78 and are at least high enough that the securing body 24 can be braced by way of them on the retaining claw 14. The spacing 76 between the end edge 74 and the hook shoulder 78 is adapted to the length 80 of the retaining claw 14, so that the securing body 24 and thus the wiper strip 18 is fixed in both longitudinal directions with as little play as possible.

Figure 7:
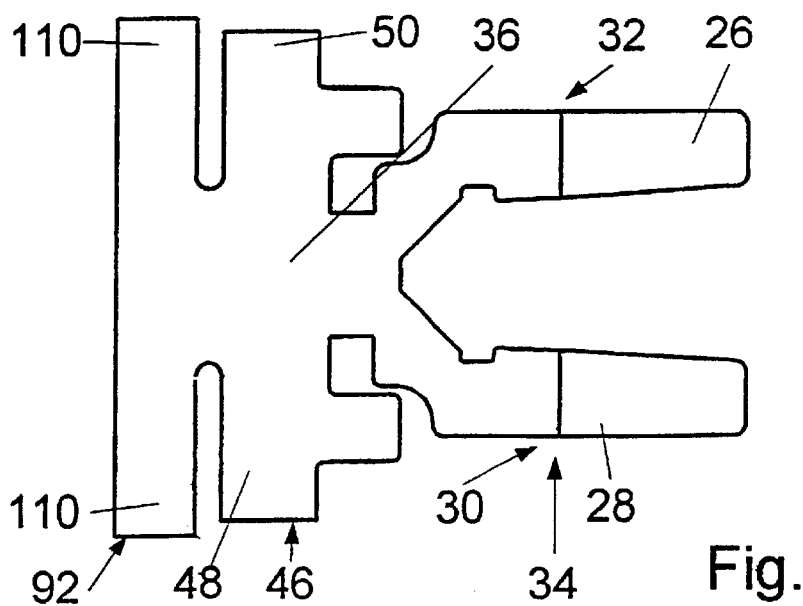
FIG. 7, a sheet-metal blank from which the securing body is bent.

It is proposed that the securing body 24, with the guide clamp 92, fastening clamp 46 and spring clamp 34, be made from a one-piece sheet-metal part, of the kind shown in FIG. 7, in a stamping and bending operation. This creates a compact component that is economical to make.

The refill kit 66 is installed as follows:

Once the spring rail 22 has been thrust into the longitudinal channel 20 of the wiper strip 18, the securing body 24 is pressed in the assembly direction 60 onto the head strip 16 far enough that the fastening clamp 46, with its still-open legs 48, 50, rests above the recesses 56, 58 of the spring rail 22. The legs 48, 50 are pressed together and in the process press the channel walls 52, 54 of the wiper strip 18 into the recesses 56, 58 of the spring rail 22. Thus the spring rail 22 is fixed in the wiper strip 18, and at the same time the securing body 24 is fixed on the wiper strip 18.

After that, the refill kit 66, with the securing body 24 installed, is thrust in the assembly direction 60 into the retaining claws 14 of the support bracket system 12, so that the retaining claws 14 engage the longitudinal grooves 102 of the wiper strip 18. The refill kit 66 is thrust into the retaining claws 14 far enough that the guide faces 40, 42 of the hooks 30, 32 come into contact with a retaining claw 14 on the arms 26, 28 of the spring clamp 34. In the process, the arms 26, 28 are deflected outward in the direction of the wiper strip 18; in the region of the hooks 30, 32, the arms 26, 28 are pressed into the recesses 44 of the spring rail 22.

Once the hooks 30, 32 have been thrust through the retaining claw 14, they are deflected outward again by the wiper strip 18 and snap into place behind the retaining claw 14. In this position, the end edges 74 of the outward bulges 72 also come into contact with the retaining claw 14. The securing body 24 can thus be braced on the retaining claw 14 in both longitudinal directions and is thus fixed jointly with the wiper strip 18 in the longitudinal direction.

What is claimed is:

1. A wiper blade (10) for cleaning windows of motor vehicles, comprising a support bracket system (12) having retaining claws (14) disposed on claw brackets (84) and gripping a head strip (16) of a wiper strip (18) of an elastic material which is fixed longitudinally with a securing body (24) shaped from sheet metal so that the securing body is solidly joined to the wiper strip (18) and engages a retaining claw (14) from behind with a pair of hooks (30, 32) in the form of a snap connection disposed on said arms (26, 28), wherein the arms (26,28) are bent to form the hooks (30,32), wherein the hooks (30,32) define shoulders extending in opposite directions transversely to the arms (26,28) in a direction outwardly from sides of the head strip (16) and a guide face (40, 42) of the arms is adjoined to a respective hook (30, 32) in an assembly direction (60).

2. The wiper blade (10) of claim 1, wherein the arms (26, 28) extend longitudinally of the wiper strip (18) laterally of the head strip (16).

3. The wiper blade (10) of claim 2, wherein the securing body (24) has a spring clamp (34) with a base part (36) which is platform-shaped and rests on an upper face (38), pointing away from the window, of the head strip (16), and the spring clamp (34) has the two arms (26, 28), extending substantially parallel to one another, and the two hooks (30, 32) are disposed in a transverse plane (108).

4. The wiper blade (10) of claim 3, wherein the spring clamp (34) is embodied integrally with the base part (36) and the arms (26, 28) are made from spring steel.

5. The wiper blade (10) of claim 1, further comprising a spring rail (22) firmly held in a longitudinal channel (20) in the head strip (16) and having a recess (44) in a region of the hooks (30, 32).

6. The wiper blade (10) of claim 5, wherein the securing body (24) has a fastening clamp (46), which grips at least partway around the head strip (16) with legs (48, 50) extending crosswise to the length thereof and presses lateral channel walls (52, 65) of the wiper strip (18) into recesses (56, 58) of the spring rail (22).

7. The wiper blade (10) of claim 6, wherein the fastening clamp (46) and the spring clamp (34) are embodied integrally.

8. The wiper blade (10) of claim 7, wherein one tab (62, 64) extending in the assembly direction (60) is disposed on each of the legs (48, 50) of the fastening clamp (46), the legs laterally including the head strip (16) of the wiper strip (18), and the retaining claw (14) of the support bracket system fits over the tab in the assembly position.

9. The wiper blade (10) of claims 8, wherein the tabs (62, 64) are curved outward from the plane of the legs (48, 50) and on each of their free ends (68) have a respective inward-pointing stop face (70).

10. The wiper blade (10) of claim 9, wherein the base part (36), in the region of the legs (48, 50) of the fastening clamp (46), has at least one outward bulge (72) with an end edge (74) pointing counter to the hooks (30, 32), and that the spacing (76) between the end edge (74) and one hook shoulder (78) is adapted to the length (80) of the retaining claw (14) of the support bracket system (12).

11. A method for producing the securing body (24) of the wiper blade of claim 1, wherein the securing body is made in a stamping and bending operation.

12. A wiper blade (10) for cleaning windows of motor vehicles, comprising a support bracket system (12), having retaining claws (14) disposed on claw brackets (84) and gripping a head strip (16) of a wiper strip (18) of an elastic material which is fixed longitudinally with a securing body (24) shaped from sheet metal so that the securing body is solidly joined to the wiper strip (18) and engages a retaining claw (14) from behind with at least one hook (30,32) in the form of a snap connection disposed on a pair of arms (26,28), the pair of arms (26,28) are bent to form the hooks (30,32), wherein the hooks (30,32) define shoulders extending in opposite directions transversely to the arms (26,28) in a direction outwardly from sides of the head strip (16) and a guide face (40,42) adjoins the hook (30,32) in the assembly direction (60), a spring rail (22) is firmly held in a longitudinal channel (20) in the head strip (16) and has a recess (44) in the region of the hooks (30,32), the securing body (24) has a fastening clamp (46), which grips at least partway around the head strip (16) with legs (48,50) extending crosswise to the wiper strip (18) length and presses lateral channel walls (52,65) of the wiper strip (18) into recesses (56,58) of the spring rail (22), characterized in that there is at least one narrow, laterally outward-pointing rib (114) in the recess (56,58).

* * * * *